March 25, 1924.
C. FEHR
1,488,037
FORE CARRIAGE FOR MOTOR CYCLES
Filed March 23, 1922  3 Sheets-Sheet 1
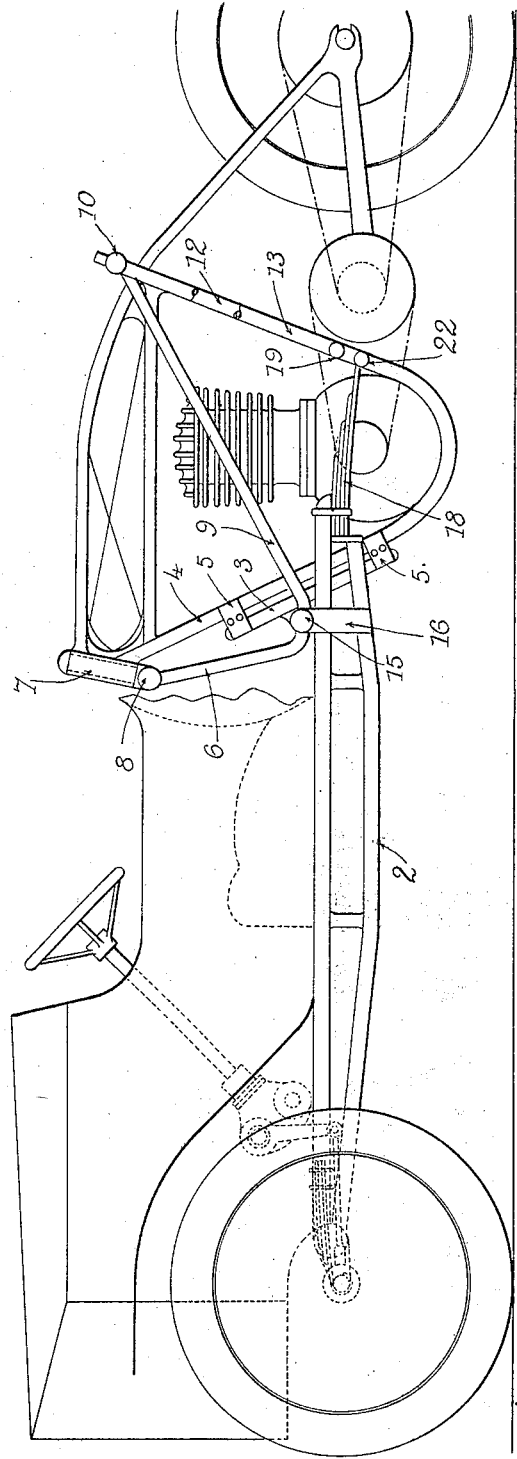

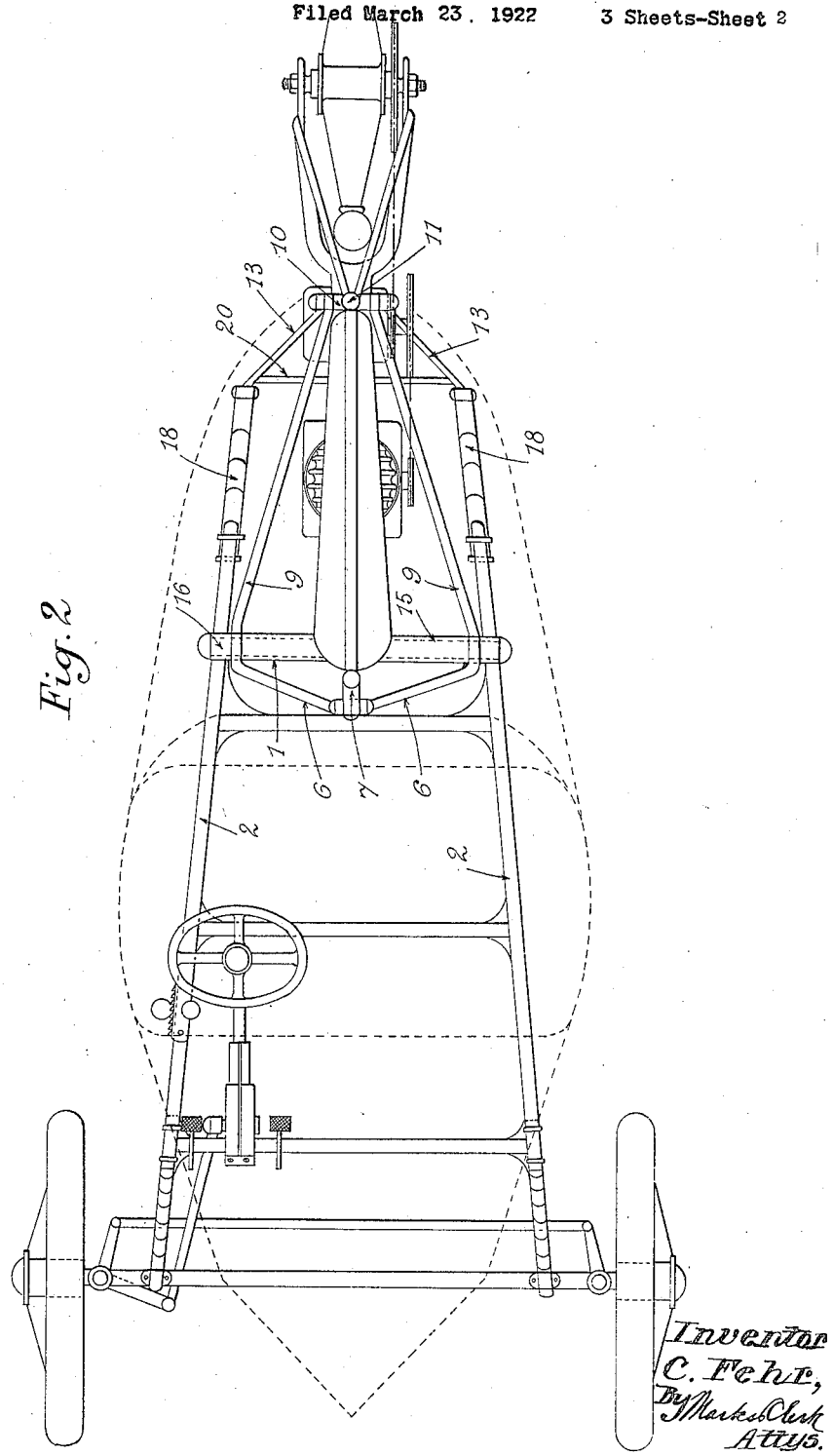

March 25, 1924.
C. FEHR
1,488,037
FORE CARRIAGE FOR MOTOR CYCLES
Filed March 23, 1922   3 Sheets-Sheet 3
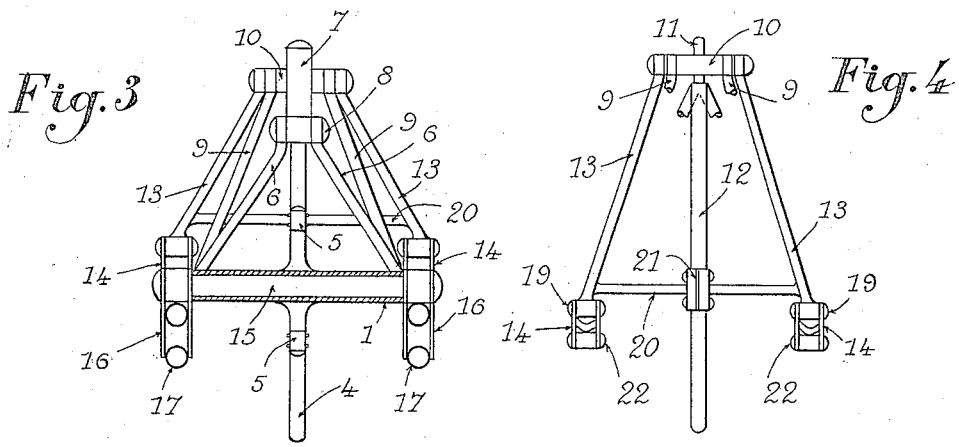
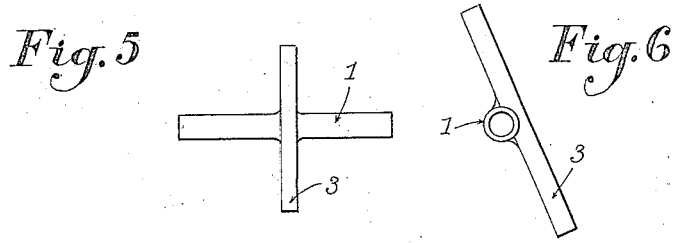
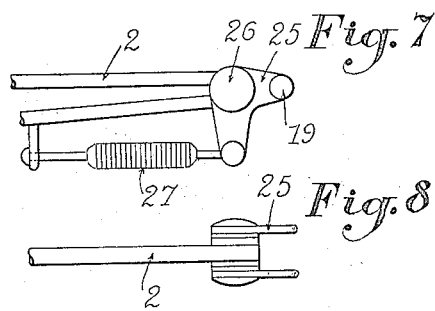
Inventor
C. Fehr,
By Marks & Clerk
Attys.

Patented Mar. 25, 1924.

1,488,037

UNITED STATES PATENT OFFICE.

CONRAD FEHR, OF PARIS, FRANCE.

FORECARRIAGE FOR MOTOR CYCLES.

Application filed March 23, 1922. Serial No. 546,134.

*To all whom it may concern:*

Be it known that I, CONRAD FEHR, citizen of the Swiss Republic, residing at Paris, in the Republic of France, have invented new and useful Improvements in Forecarriages for Motor Cycles, of which the following is a specification.

This invention has for its object a two-wheeled fore-carriage by means of which any usual type of motorcycle may be readily converted into a three-wheeled cyclecar, the two wheels of the fore-carriage acting then as steering wheels, while the rear wheel of the motorcycle acts as a driving wheel. No transformation of the motorcycle is required with the exception that the front fork together with its wheel has to be removed and the existing controlling members for the motor have to be replaced by longer ones. The fore-carriage can thus be easily taken apart and the motor-cycle may be used again separately when desired.

When the motorcycle has been converted into a cyclecar, the driver is able to drive the machine either as a motor-car by sitting in the vehicle body of the fore-carriage and using a steering hand wheel and pedals, and operating levers for the gear box, the brakes, etc., or as an ordinary motorcycle by using the steering handle which is then connected to the steering wheels of the fore-carriage, the operator sitting then on the saddle.

In carrying out my invention, I preferably use a cradle by means of which all direct fastenings between the motorcycle and the frame of the fore-carriage may be omitted. The fore-carriage frame can thus be of a very simple construction and a single type of fore-carriage frame may be used for all types of motorcycles. The motorcycle is secured to the cradle which latter is preferably provided with a transverse horizontal shaft upon which the fore-carriage frame is pivoted.

The cradle may be suspended by means of springs of various shapes if it is mounted on motorcycles having a rigidly mounted frame and it may be secured rigidly to the fore-carriage frame when the suspension of the motorcycle alone is sufficiently elastic.

In the accompanying drawings given by way of example:

Fig. 1 is an elevation view of the removable fore-carriage which is the object of my invention, connected to a motorcycle and comprising a yieldingly mounted frame.

Fig. 2 is a corresponding plan view.

Fig. 3 is a front view of the cradle, the transverse horizontal shaft and the longitudinal members of the fore-carriage frame being shown in section.

Fig. 4 is a view from the rear showing a triangular supporting frame.

Fig. 5 is an elevation view of a cross shaped member formed by the transverse horizontal shaft and an inclined rod secured thereto.

Fig. 6 is a corresponding side view.

Fig. 7 is a detail in elevation of a modified arrangement of springs.

Fig. 8 is a corresponding plan view.

In the construction shown in the drawings, the fore-carriage comprises a cradle, the main parts of which are a strong transverse horizontal shaft 1 of tubular construction, two front inclined members 6 and two rear inclined members 9. Welded or otherwise secured to the middle portion of the shaft 1 is an inclined rod or tube 3 (Figs. 5 and 6) located in a plane at right angles to the shaft 1 and forming therewith a rigid cross like member. The rod 3 is secured to the front part 4 of the frame of the motorcycle by means of straps 5. Secured at the ends of the tube 1 by welding, straps or pivoted joints are the two front inclined members 6 which may be of solid or tubular construction and may have a fixed or adjustable length. Said uprights 6 are connected to the lower end of an eye bolt 8, the shank of which extends longitudinally through the steering tube or pillar 7 of the motorcycle and is secured therein. The inclined uprights 6 could also be secured by means of straps to the outside of the tube 7 or to the fastening member for a side-car, provided on the frame of the motor-cycle in an adjacent location. The two uprights 6 form with the steering tube 7 of the motorcycle a structure having a great rigidity in all directions.

Upon the ends of the shaft or tube 1 are also secured the two rear inclined uprights 9 which are solid or hollow and are connected to a transverse rod 10 made integral with, or secured to a rod 11, which latter engages into the saddle carrying tube 12 of the motor-cycle frame. Said uprights 9 could however be connected to a triangular supporting frame 13 which will be described later on, at any desired point, between the rod 10 and the spring shackles 14. The uprights 9 will thus form with the uprights 6, the tubes of the motorcycle frame and the main transverse shaft or tube 1, a structure which is rigid in all directions.

The frame 2 of the fore-carriage is connected to the shaft 1 of the cradle by means of two brackets 16 in which a shaft 15 is rigidly secured at its ends. Said shaft rotates in the tube 1 and acts also as a transverse bracing member for the frame. By means of said construction, the frame 2 of the fore-carriage and the vehicle body carried thereon may swing vertically, with respect to the motorcycle and the cradle secured thereto, about the axis of the shaft 15; this will by no means reduce the rigidity of the machine since the tubular shaft 1 and the shaft 15 extend the whole width of the frame 2.

The frame 2 may be constructed of welded tubes or pressed sheet metal. It carries a vehicle body which may be permanently secured thereto or removable. It is supported by means of springs on a front axle having at its ends two front steering wheels. The frame 2 carries a steering handwheel and also controlling pedals and levers which are connected to the motor parts of the motorcycle by suitable transmissions.

At the rear ends of the longitudinal members of the fore-carriage frame 2, are mounted two half-springs 18 which are connected at their rear ends, as shown at 22, to spring shackles 14 (Fig. 4) pivoted at 19 on the inclined uprights 14 of a rigid triangular frame, the lower horizontal part of which, 20, is connected to the saddle carrying tube 12 by means of a collar or strap 21. The rods 13 are connected at the top to the transverse rod 10 near the uprights 9.

Instead of the laminated springs 8 shown in Fig. 1, any other construction of suspension can be used. I have shown in Figs. 7 and 8 bell crank levers 25 pivoted at 26 on the frame 2 and connected to coil springs 27. The springs can also be secured either directly or not to the saddle carrying tube.

It will be noted that the rigid triangular frame formed by the rods 13 and 20 being mounted well at the rear of the fore-carriage, any lateral bending or deformation of the machine frame in turning is efficiently prevented.

The driving wheel of the motorcycle may obviously be of a twin construction, if desired.

Having now described my invention, what I claim as new and desire to secure by Letters Patent is:

1. A removable fore-carriage for motorcycles comprising a frame, a front axle, steering wheels carried by said front axle, a vehicle body carried by said frame, and a separate cradle adapted to be removably secured on the one hand to the rear end of said frame and on the other hand to the motorcycle frame.

2. A removable fore-carriage for motorcycles comprising a frame, a front axle, steering wheels carried by said front axle, a vehicle body carried by said frame, a separate cradle adapted to connect said frame to the motorcycle frame, means for pivotally mounting said cradle to the rear end of said frame and means for removably securing said cradle to the motorcycle frame.

3. A removable fore-carriage for motorcycles comprising a frame having two longitudinal members a front axle, two front steering wheels, means for controlling said steering wheels, a vehicle body carried by said frame, a main transverse member, means for connecting the rear part of the longitudinal members of the frame to the end of said transverse member, means for fastening said member to the lower front part of the motorcycle frame, two front inclined uprights which converge upwardly and are connected at the rear to the ends of said transverse member, means for connecting the front ends of said front uprights to the front upper part of the motorcycle frame, two rear inclined uprights which converge upwardly and are connected at the front to the ends of said transverse member, and means for connecting the rear ends of said rear uprights to the rear upper part of the motorcycle frame.

4. A removable fore-carriage for motorcycles comprising a frame having two longitudinal members, a front axle, two front steering wheels, means for controlling said steering wheels, a vehicle body carried by said frame, a main transverse member, a transverse shaft rotatably supported on said transverse member, means for connecting the rear part of the longitudinal members to said transverse shaft, means for fastening the transverse member to the lower front part of the motorcycle frame, two front inclined uprights which converge upwardly and are connected at the rear to the ends of said transverse member, means for connecting the front ends of said front uprights to the front upper part of the motorcycle frame, two rear inclined uprights which converge upwardly and are connected at the front to the ends of said transverse member and means for connecting the rear ends of said rear uprights to the rear upper part of the motorcycle frame.

5. A removable fore-carriage for motorcycles comprising a frame having two longitudinal members, a front axle, two front steering wheels, means for controlling said steering wheels, a vehicle body carried by said frame, a main transverse member, a transverse shaft rotatably supported on said transverse member, means for connecting the rear part of the longitudinal members to said transverse shaft, an inclined rod secured to the transverse member in a plane normal to the axis of said transverse member, means for fastening said inclined rod to the lower front part of the motorcycle frame, two front inclined uprights which converge upwardly and are connected at the rear to the ends of said transverse member, means for connecting the front ends of said front uprights to the front upper part of the motorcycle frame, two rear inclined uprights which converge upwardly and are connected at the front to the ends of said transverse member and means for connecting the rear ends of said rear uprights to the rear upper part of the motorcycle frame.

6. A removable fore-carriage for motorcycles comprising a frame having two longitudinal members, a front axle, two front steering wheels, means for controlling said steering wheels, a vehicle body carried by said frame, a main transverse member, a transverse shaft rotatably supported on said transverse member, means for connecting the rear part of the longitudinal members to said transverse shaft, means for fastening the transverse member to the lower front part of the motorcycle frame, two front inclined uprights which converge upwardly and are connected at the rear to the ends of said transverse member, means for connecting the front ends of said front uprights to the front upper part of the motorcycle frame, two rear inclined uprights which converge upwardly and are connected at the ends of said transverse member, means for connecting the rear ends of said rear uprights to the rear upper part of the motorcycle frame and means for yieldingly connecting the rear end of the fore-carriage to the rear part of the motorcycle frame.

7. A removable fore-carriage for motorcycles comprising a frame, having two longitudinal members, a front axle, two front steering wheels, means for controlling said steering wheels, a vehicle body carried by said frame, a main transverse member, a transverse shaft rotatably supported on said transverse member, means for connecting the rear part of the longitudinal members to said transverse shaft, means for fastening the transverse member to the lower front part of the motorcycle frame, two front inclined uprights which converge upwardly and are connected at the rear to the ends of said transverse member, means for connecting the front ends of said front uprights to the front upper part of the motorcycle frame, two rear inclined uprights which converge upwardly and are connected at the front to the ends of said transverse member, a cross horizontal shaft supported by the saddle carrying tube of the motorcycle frame, means for connecting the rear ends of the rear uprights to said cross horizontal shaft, a triangular frame formed of two inclined members secured at their upper ends to said cross horizontal shaft and a lower transverse member, means for yieldingly connecting the lower ends of said inclined members to the rear end of the fore-carriage frame and means for connecting the said lower transverse member to the saddle carrying tube of the motorcycle frame.

In testimony whereof I have signed my name to this specification.

CONRAD FEHR.